US010730180B2

(12) United States Patent
Rossano et al.

(10) Patent No.: US 10,730,180 B2
(45) Date of Patent: Aug. 4, 2020

(54) USER INTERFACE FOR A TELEOPERATED ROBOT

(71) Applicant: ABB Schweiz AG, Baden (CH)

(72) Inventors: Gregory F. Rossano, Enfield, CT (US); Carlos Martinez, South Windsor, CT (US); Jianjun Wang, West Hartford, CT (US); Biao Zhang, West Hartford, CT (US); Thomas A. Fuhlbrigge, Ellington, CT (US)

(73) Assignee: ABB Schweiz AG, Baden (CH)

( * ) Notice: Subject to any disclaimer, the term of this patent is extended or adjusted under 35 U.S.C. 154(b) by 394 days.

(21) Appl. No.: 15/825,914

(22) Filed: Nov. 29, 2017

(65) Prior Publication Data

US 2018/0154518 A1    Jun. 7, 2018

Related U.S. Application Data

(63) Continuation of application No. PCT/US2016/034658, filed on May 27, 2016.
(Continued)

(51) Int. Cl.
*B25J 9/16* (2006.01)
*B25J 13/02* (2006.01)
(Continued)

(52) U.S. Cl.
CPC ............. *B25J 9/161* (2013.01); *B25J 9/1671* (2013.01); *B25J 9/1689* (2013.01); *B25J 9/1692* (2013.01);
(Continued)

(58) Field of Classification Search
CPC ........ B25J 9/161; B25J 9/1692; B25J 9/1697; B25J 11/005; B25J 13/085; B25J 13/025;
(Continued)

(56) References Cited

U.S. PATENT DOCUMENTS 6,242,879 B1 * 6/2001 Sagues ................. G03F 7/7075
318/567
6,567,725 B1 * 5/2003 Wilkey ............... G05B 19/401
318/568.1

(Continued)

OTHER PUBLICATIONS

Hahunuma et al., Development of Teleoperation Master System with a Kinesthetic Sensation of Presence, 1999, Internet, p. 1-7 (Year: 1999).*

(Continued)

*Primary Examiner* — McDieunel Marc
(74) *Attorney, Agent, or Firm* — Taft Stettinius & Hollister LLP; J. Bruce Schelkopf (57) ABSTRACT

A teleoperated robotic system that utilizes a graphical user interface (GUI) to perform work on a workpiece(s) using a robot. A coordinate system of the GUI is correlated to the tool center point (TCP) of the robot and the TCP or workspace of a teleoperated member, such as a haptic joystick. Operable manipulation of the teleoperated member is correlated to a movement at a particular location in the robot station, such as movement of the TCP of the robot. The GUI can also provide digital representations of the workpiece, which is based on inputted and/or scanned information relating to a reference workpiece and/or the particular workpiece on which the robot is performing work. The GUI can further provide indications of the various stages of assembly of the workpiece, as well as an indication of work already, or to be, performed on the workpiece.

24 Claims, 5 Drawing Sheets

Related U.S. Application Data (60) Provisional application No. 62/168,010, filed on May 29, 2015.

(51) Int. Cl.

| | | |
|---|---|---|
| *B25J 13/06* | (2006.01) | |
| *B25J 13/08* | (2006.01) | |
| *B25J 11/00* | (2006.01) | |
| *G06F 3/0484* | (2013.01) | |
| *G06K 9/20* | (2006.01) | |
| *G06K 9/62* | (2006.01) | |
| *G06K 9/78* | (2006.01) | |

(52) U.S. Cl.
CPC ......... *B25J 9/1697* (2013.01); *B25J 11/0055* (2013.01); *B25J 13/025* (2013.01); *B25J 13/065* (2013.01); *B25J 13/085* (2013.01); *G06F 3/04842* (2013.01); *G05B 2219/39014* (2013.01); *G05B 2219/40219* (2013.01); *G06K 9/209* (2013.01); *G06K 9/6202* (2013.01); *G06K 9/78* (2013.01); *Y10S 901/02* (2013.01); *Y10S 901/09* (2013.01); *Y10S 901/41* (2013.01); *Y10S 901/47* (2013.01)

(58) Field of Classification Search
CPC ...... B25J 13/065; B25J 9/1689; B25J 9/1674; G06K 9/209; G06K 9/6202; G06K 9/78; Y10S 901/09; Y10S 901/41; Y10S 901/02; G06F 3/04842; G06F 3/016
See application file for complete search history.

(56) References Cited

U.S. PATENT DOCUMENTS

| | | | | |
|---|---|---|---|---|
| 6,681,151 B1* | 1/2004 | Weinzimmer | ......... | B25J 9/1697 219/121.85 |
| 6,920,373 B2* | 7/2005 | Xi | ......... | B25J 9/1689 318/611 |
| 7,236,852 B2* | 6/2007 | Moridaira | ......... | B62D 57/032 318/568.1 |
| 7,584,020 B2* | 9/2009 | Bruemmer | ......... | G06N 3/008 318/567 |
| 7,620,477 B2* | 11/2009 | Bruemmer | ......... | G06N 3/008 180/167 |
| 7,668,621 B2* | 2/2010 | Bruemmer | ......... | G05D 1/0088 318/568.12 |
| 8,369,992 B2* | 2/2013 | Barajas | ......... | B25J 9/1674 601/33 |
| 2002/0068992 A1* | 6/2002 | Hine | ......... | H01L 21/67259 700/229 |
| 2006/0009047 A1* | 1/2006 | Wirth | ......... | H01L 21/67098 438/800 |
| 2007/0150100 A1* | 6/2007 | Saraliev | ......... | H01L 21/68 700/245 |
| 2008/0009969 A1 | 1/2008 | Bruemmer et al. | | |
| 2009/0036902 A1* | 2/2009 | DiMaio | ......... | A61B 34/10 606/130 |
| 2009/0055019 A1 | 2/2009 | Stiehl et al. | | |
| 2014/0247119 A1 | 9/2014 | Robbins et al. | | |
| 2016/0229050 A1* | 8/2016 | Wang | ......... | G06F 3/016 |
| 2016/0303739 A1* | 10/2016 | Apkarian | ......... | B25J 3/04 |
| 2018/0078318 A1* | 3/2018 | Barbagli | ......... | A61B 1/2676 |
| 2019/0117247 A1* | 4/2019 | Kim | ......... | A61B 34/37 |

OTHER PUBLICATIONS

Kheddar et al., Multi-Robots Teleoperation—Analysis and Prognosis, 1997, IEEE, p. 166-171 (Year: 1997).*
Sian et al., Whole Body Teleoperation of a Humanoid Robot—Development of a Simple Master Device using Joysiticks, 2002, IEEE, p. 2569-2574 (Year: 2002).*
Hou et al., Teleoperation Characteristics and Human Response Factor in Relation to a Robotic Welding System, 1996, IEEE, p. 1195-1196 (Year: 1996).*
Kofman et al., Teleoperation of a robot manipulator using a vision-based human-robot interface, 2005, IEEE, p. 1206-1219 (Year: 2005).*
Yepes et al., Implementation of an Android based teleoperation application for controlling a KUKA-KR6 robot by using sensor fusion, 2013, IEEE, p. 1-5 (Year: 2013).*
Keerio et al., Virtual Reality Based Teleoperation Control of Humanoid Robot BHR-2, 2007, IEEE, p. 1160-1165 (Year: 2007).*
Bejczy, Virtual reality in robotics, 1996, IEEE, p. 7-15 (Year: 1996).*
International Search Report and Written Opinion, PCT/US2016/034658, ABB Technology AG, dated Jul. 26, 2016, 8 pages.
Ince, Ilhan et al., "Virtuality and Reality: a Video/Graphics Environment for Teleoperation", IEEE, Oct. 13, 1991, vol. 2, pp. 1083-1089.
Brooks, Thurston L. et al., "Operator Vision Aids for Telerobotic Assembly and Servicing in Space", IEEE Comp. Soc. Press, May 12, 1992, vol. conf. 8, pp. 886-891, New York, US.
Kim, Won S., "Graphical Operator Interface for Space Telerobotics", IEEE Comp. Soc. Press, vol. conf. 10, May 2, 1993, pp. 761-768, New York, US.
Bejczy Antal K. et al., "The Phantom Robot: Predictive Displays for Teleoperation with Time Delay", IEEE Comp. Soc. Press, vol. -, May 13, 1990, pp. 546-551.
Sheridan, TB, "Space Teleoperation Through Time Delay: Review and Prognosis", IEEE Inc., Oct. 1, 1993, vol. 9, No. 5, pp. 592-606.
European Extended Search Report, EP Appln. No. 16903348.7, dated Apr. 28, 2020, 14 pgs.

* cited by examiner

USER INTERFACE FOR A TELEOPERATED ROBOT

BACKGROUND

Embodiments of the present application generally relate to the teleoperation of an industrial robot. More particularly, embodiments of the present application generally relate to a user interface for the teleoperation of an industrial robot.

Industrial robots are often constructed, as well as programed, to maneuver about one or more axes of the robot. For example, certain types of industrial robots can be automatically controlled, reprogrammable, or multipurpose manipulator programmable so as to maneuver about three or more axes of the robot. Such maneuverability can accommodate movement of the robot along one or more paths and/or to one or more points so that the robot can be positioned and/or oriented to perform work, either directly or through the operation of a tool, at various locations on a workpiece. Additionally, certain robots may, or may not, be in a generally fixed location or position. More specifically, certain types or robots may be configured to, or coupled to equipment that accommodates, travel along a workpiece and/or along different locations or areas of a work space.

Teleoperation of an industrial robot typically occurs when an operator of the industrial robot is located at a location away or apart from the robot. The distances between the operator and robot during teleoperation may vary for different circumstances or situations. For example, in certain situations, teleoperation of the robot may occur when the robot and operator are separated from each other by a protective wall or barrier, or the robot and operator are at different geographic locations. Indeed, in certain situations, the teleoperated robot may, or may not, be within the operator's line of sight. For example, in certain instances, the teleoperation of the industrial robot may occur when the robot and operator are separated by a barrier or other distances at least as the robot performs work that could be hazardous to the health or safety of operator. Further, teleoperation of the robot can occur when the operator is located at a remote facility or another, different location in the same facility.

Instances of the teleoperated robots performing work can include, but is not limited to, the robot holding, maneuvering, and/or displacing a workpiece or part, including, for example, holding a workpiece that the robot is positioning and/or orienting to be assembled to another workpiece or part. Additionally, the teleoperated robot performing work can also include, but, again, is not limited to, the robot holding, coupled to, and/or operating a tool or other device in connection with performing work on a workpiece, including, and without limitation, welding, drilling, milling, and/or shaping the workpiece, among a variety of other types of work on workpieces.

BRIEF SUMMARY

An aspect of an embodiment of the present application is a system for providing a graphic user interface for a teleoperation robotic system having a teleoperated member at an operator station and a robot at a robot station. The system can include a computing device having at least one processor, the computing device being configured to receive a first input information having a robot indicator, the robot indicator indicating at least one of a position or an orientation of at least a portion of the robot, the first input information including information detected by one or more sensors in the robot station. The computing device can be further configured to calibrate the robot indicator to a coordinate system of the graphic user interface to provide a calibrated robot indicator. Additionally, the computing device can receive a second input information having a teleoperated member indicator indicating at least one of a position or an orientation of the teleoperated member, and calibrate the teleoperated member indicator to the coordinate system of the graphic user interface to provide a calibrated teleoperated member indicator. Further, the computing device can further synchronize the calibrated position of the calibrated teleoperated member to the calibrated robot indicator. The computing device can also display on a display the graphical user interface, the graphical user interface being further configured to display a movement in the robot station that is associated with at least a movement of the robot that is correlated to the operation of the teleoperated member.

Another aspect of the present application is a method for providing a graphic user interface for a teleoperation robotic system having a teleoperated member at an operator station and a robot at a robot station. The method can include detecting, using one or more sensors of the robot station, a robot indicator of the robot, the robot indicator corresponding to at least one of a position or an orientation of at least a portion of the robot, and communicating the robot indicator to a computing device. Further, the robot indicator can be correlated to a coordinate system of the graphical user interface to provide a calibrated robot indicator. A teleoperated member indicator, which can comprise at least one of a position and an orientation of the teleoperated member can also be detected and correlated to the coordinate system of the graphical user interface to provide a calibrated teleoperated member indictor. The correlated teleoperated member indicator can be synchronized with the correlated robot indicator. Further, a display can display a movement in the robot station that is synchronized by the computing device to correspond to a movement of the teleoperated member.

BRIEF DESCRIPTION OF THE DRAWINGS

The description herein makes reference to the accompanying figures wherein like reference numerals refer to like parts throughout the several views.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 1:
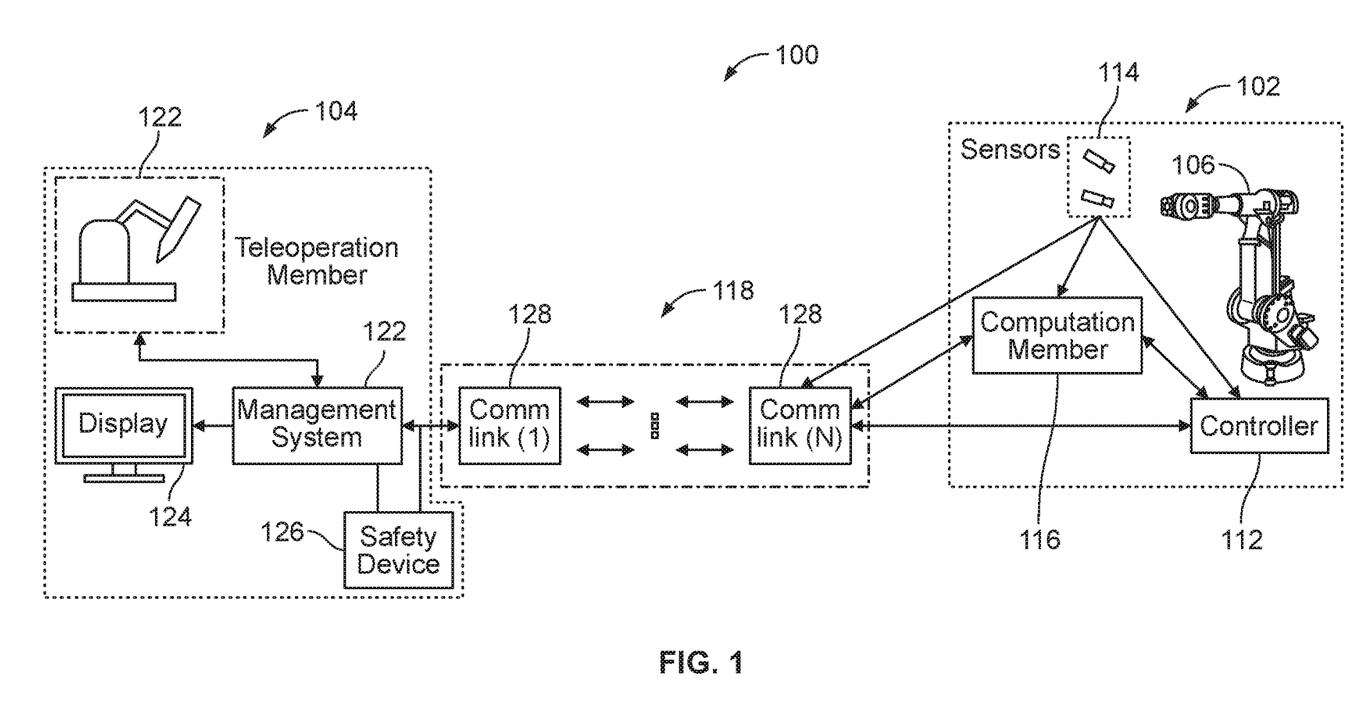
FIG. 1 illustrates a schematic of an exemplary teleoperation robotic system according to an illustrated embodiment of the present application.

FIG. 1 illustrates a schematic of an exemplary teleoperation robotic system 100 according to an illustrated embodiment of the present application. As shown, the teleoperation robotic system 100 can include at least one robot station 102 and at least one operator station 104. The teleoperation robotic system 100 can further include a communication network or link 118 that is configured to communicatively link or couple the operator station 104 to the robot station 102.

According to certain embodiments, the robot station 102 includes one or more robots 106 having one or more degrees of freedom. For example, according to certain embodiments, the robot 106 can have at least three axes, including, but not limited to, robots having six degrees of freedom. Examples of such robots can include, but are not limited to, industrial robots available from ABB, Inc. Referencing FIG. 2, according to certain embodiments, an end effector 108 can be coupled or mounted to the robot 106. For example, according to certain embodiments, the end effector 108 can be mounted to a wrist or arm 110 of the robot 106. Further, as discussed below, at least portions of the wrist, arm 110, and/or end effector 108 can be moveable relative to other portions of the robot 106 and/or a workpiece via remote operation of the robot 106 and/or end effector 108 by an operator of the operator station 104, as discussed below.

Figure 2:
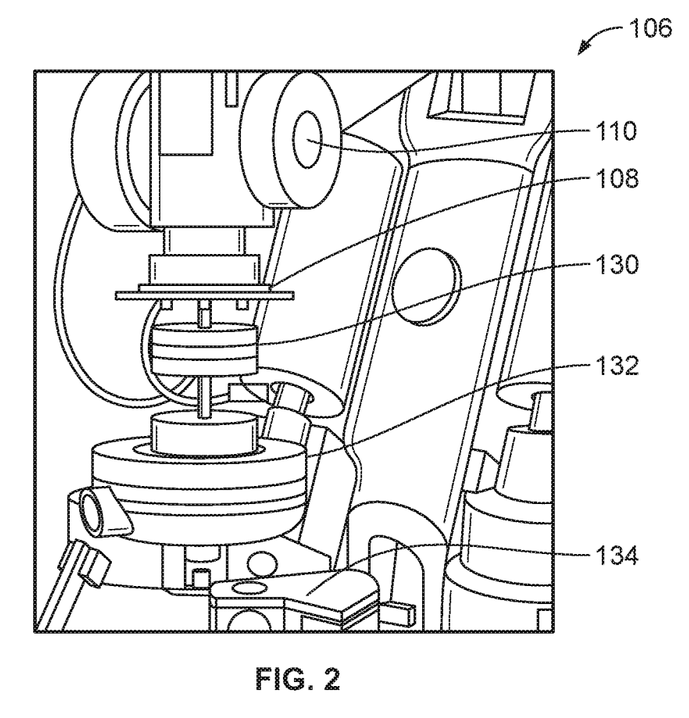
FIG. 2 illustrates a portion of a robot of a robot station performing exemplary work on a workpiece and in which the robot is coupled to both a force sensor and an end effector.

According to certain embodiments, the robot 106 can be operative to position and/or orient the end effector 108 at locations within reach of a work envelope or workspace of the robot 106 that can accommodate the robot 106 utilizing the end effector 108 to perform work on a workpiece. A variety of different types of end effectors 108 can be utilized by the teleoperation robotic system 100, including, for example, an end effector 108 that is a painting or coating spraying device or tool, welding gun, gripper(s), fixture, spotlight(s), conveyor, and/or a milling or drilling tool, among other types of tools or devices that can perform work on, grip, displace, and/or perform other functions relating to a workpiece. Further, operation of the robot 106 and/or the end effector 108 can be utilized to perform work on a stationary or moving workpiece, and/or can hold the workpiece.

The robot 106 can include or be electrically coupled to one or more controllers 112. For example, according to certain embodiments, the robot 106 can include and/or be electrically coupled to one or more controllers that may, or may not, be discrete processing units, such as, for example, a single controller or any number of controllers. The controller 112 can be configured to provide a variety of functions, including, for example, be utilized in the selective delivery of electrical power to the robot 106 and/or to control the movement of the robot 106 and/or the operation of other equipment that is mounted to the robot 106, including, for example, the end effector 108.

The controller 112 can take a variety of different forms, and can be configured to execute program instructions to perform tasks associated with operating robot 106, and moreover, to operate the robot 106 to perform various functions, such as, for example, but not limited to, tasks described herein. In one form, the controller(s) 112 is/are microprocessor based and the program instructions are in the form of software stored in one or more memories. However, it is alternatively contemplated that one or more of the controllers 112 and the program instructions executed thereby may be in the form of any combination of software, firmware and hardware, including state machines, and may reflect the output of discreet devices and/or integrated circuits, which may be co-located at a particular location or distributed across more than one location, including any digital and/or analog devices configured to achieve the same or similar results as a processor-based controller executing software or firmware based instructions. Operations, instructions, and/or commands determined and/or transmitted from the controller 112 can be based on one or more models stored in non-transient computer readable media in a controller 112, other computer, and/or memory that is accessible or in electrical communication with the controller 112. Further, according to certain embodiments, the controller 112 can be configured to dynamically control the movement of both the robot 106 itself, as well as the movement of other devices to which the robot 106 is mounted or coupled, and which can further displace or move the robot about at least a portions of the robot station 102, and thereby dynamically control at least the movement of the robot 106.

According to the illustrated embodiment, the controller 112 includes a data interface that can accept motion commands and provide actual motion data. Optionally, the robot station 102 can also include one or more sensors 114 that can be used in connection with observing the robot station 102, including the robot 106 and workpieces or parts on which the robot 106 and/or end effector 108 are performing work. Examples of such sensors 114 can include imaging capturing devices, microphones, position sensors, proximity sensors, accelerometers, motion sensors, and/or force sensors, among other types of sensors and sensing devices. The sensors 114 can output data or information that is utilized in connection with providing input signals to the controller 112 that the controller 112 uses to control the robot 106 in the performance of work on the workpiece.

Additionally, according to certain embodiments, at least some of the sensors 114 may, or may not, be smart sensors such that have data processing capabilities. According to embodiments in which the sensor(s) 114 is/are, or includes, one or more smart sensors, the smart sensor(s) can be electrically coupled to the controller 112 such that data from, or processed by, the smart sensor(s) can be communicated to the controller 112. Alternatively, according to certain embodiments, the sensor(s) 114 may not be smart sensors, and thus may not have data processing capabilities. Thus, according to embodiments in which the sensor(s) 114 is/are, or includes sensors that are not smart sensors, the non-smart sensors can be electrically coupled to a computation member 116 that is adapted to process data or information outputted from the non-smart sensors. Alternatively, data or information outputted from the non-smart sensors, if any, can be outputted to the communication network or link 118 and processed by a management system 122 of the operator station 104, as discussed below in more detail.

The operator station 104 is configured to, in connection with communications to/with the robot station 102, provide an operator of the operator station 104 direct remote control of the robot 106 and attached processes from the operator station 104. According to the exemplary embodiment depicted in FIG. 1, the operator station 104 can include at least one teleoperation member 122, one or more displays 124, and the management system 122. The at least one teleoperation member 122 can be structured to receive commands or other input information from the operator of the teleoperation member 122, including, but not limited to, commands provided through the physical engagement and/or movement of at least a portion of the teleoperation member 122 and/or operator. For example, according to certain embodiments, the teleoperation member 122 can be one or more joysticks, a stylus-type device, and/or a sensing device that can be manipulated or moved by the operator, or which can track movement of at least a portion of the teleoperation member 122 and/or body of the operator. Further, according to certain embodiments, the teleoperation member 122 can be, or include, a touch screen of the display 124. Such interaction between the operator and the teleoperation member 122 can, according to certain embodiments, be configured to translate certain movements or actions by the operator into continuous motion signals relating to the movement of the robot 106, such as, for example, position and/or speed signals. For example, according to certain embodiments in which the teleoperation member 122 is a joystick, movement of the joystick or a stick of the joystick can be converted to electronic signals indicative of the direction(s) or movement that are translated into corresponding similar movement of the robot 106 and/or a speed of movement of the robot 106.

According to certain embodiments, the teleoperation member 122 can include haptic capabilities and/or can be a haptic device, including, for example, a teleoperation member 122 device that experiences feedback in the form of vibrations sensed by the operator through the teleoperation member 122, among other sensory feedback to the operator, relating to forces experienced and/or encountered by the robot 106 and/or end effector 108. Alternatively, or additionally, the teleoperation member 122 can include haptic capabilities in which the teleoperation member 122 includes one or more tactile sensors that can measure or sense forces exerted on the teleoperation member 122 by the operator. Such forces can be translated into the movement or operation of the robot 106, including, for example, the force an end effector 108 used by the robot 106 exerting a corresponding force on the workpiece, such as a clamping, gripping, and/or striking force.

According to the illustrated embodiments, signals or information provided by the teleoperation member 122 based on movement, operation, and/or engagement of the operator with the teleoperation member 122 can be electrically communicated to the management system 122. The management system 122 can be any type of computing device, such as, for example, a laptop, desktop computer, personal computer, programmable logic controller (PLC), or a mobile electronic device, among other computing devices, that includes a memory and a processor sufficient in size and operation to store and manipulate a database and one or more applications for at least communicating with the robot station 102 via the communication network or link 118. In certain embodiments, the management system 122 can include a connecting device that may communicate with the communication network or link 118 and/or robot station 102 via an Ethernet WAN/LAN connection. In certain other embodiments, the management system 122 can include a web server, or web portal, and/or may communicate with the communication network or link 118 and/or robot station 102 via the internet.

In addition to processing data provided from the operator station 104, such as, for example, information outputted by the teleoperation member 122, the management system 122 can also process information provided from the robot station 102 and/or the communication network or link 118. For example, the management system 122 can process information provided by the sensor(s) 114, the robot 106, the controller 112, and/or the computation member 116. According to certain embodiments, such information provided to the management system 122 from the robot station 102 and/or the communication network or link 118 may be processed by the management system 122 in a manner that provides a visual indication or information regarding the operation of the robot 106 and/or work on the workpiece that can be displayed on the display 124, either as a captured image(s) and/or as a digital representation. Further, the management system 122 may process information from the robot station 102 and/or the communication network or link 118 in a form that provides information for the operation of certain haptic capabilities of the teleoperation member 122.

A variety of different types of devices can be utilized as the display 124, including, for example one or more monitors or devices that include one or more monitors. According to certain embodiments, the display 124 can be a display 124 of the management system 122, such as, for example, a display of a PLC, laptop, or desktop computer. The display 124 can be configured to provide a visual indication of actual data about the robot and/or related processes, including, for example, data or information related to the motion, position, orientation, and/or operation of the robot 106 and/or data or information relating to the workpiece.

The operator station 104 can also include a variety of different types of safety enabling devices 126. According to certain embodiments, the safety enabling device(s) 126 can be separate and distinct from the teleoperation member 122, such as, for example, a three position switch that can accommodate an emergency shutdown of the robot 106 or other portions of the robot station 102. Moreover, according to certain embodiments, the safety enabling device(s) 126 can be configured to facilitate a shutdown of attached processes, such as, for example, via disabling power to the robot 106 or other devices associated with the operation or function of the robot station 102. According to certain embodiments, the safety enabling devices 126 can be coupled to the management system 122 or bypass the management system 122.

The communication network or link 118 can be structured to connect the robot station 102 to the operator station 104. More specifically, according to certain embodiments, the communication network or link 118 can be structured to facilitate a communicative connection between the management system 122 of the operator station 104 and the controller 112 of the robot station 102. According to the illustrated embodiment, the communication network or link 118 comprises one or more communication links 128 (Comm link$_{1-N}$ in FIG. 1). Additionally, the system 100 can be operated to maintain a relatively reliable real-time communication link, via use of the communication network or link 118, between the operator station 104 and the remotely located robot station 102. Thus, according to certain embodiments, the system 100 can changes parameters of the communication link 128, including, for example, the selection of the utilized communication links 128, as well as the motion of the robot 106 based on the currently available data rate and/or transmission time of the communication links 128.

The communication network or link 118 can be structured in a variety of different manners. The communication network or link 118 between the operator station 104 and the robot station 102 can be realized through the use of one or more of a variety of different types of communication technologies, including, but not limited to, via the use of fiber-optic, radio, cable, or wireless based technologies on similar or different types and layers of data protocols. For example, according to certain embodiments, the communication network or link 118 can utilize an ethernet installation(s) with wireless local area network (WLAN), local area network (LAN), cellular data network, Bluetooth, ZigBee, point-to-point radio systems, laser-optical systems, and/or satellite communication links, among other wireless industrial links or communication protocols.

According to certain embodiments, the communication network or link 118 can be configured based on the physical distance between one or more of the at least one robot station 102 and one or more of the at least one operator station 104. For example, according to certain embodiments, the operator station 104 may be in relatively close proximity to the robot station 102, such as, for example, being on opposing sides of a barrier, including, for example, a sheet or wall. Moreover, according to certain embodiments, the operator station 104 and the robot station 102 can be in the same facility or complex of facilities. According to such embodiments, the operator station 104 may be generally directly coupled to the robot station 102 and/or utilize a shared networked communication system of the common facility(ies), among other manners of communication. Alternatively, according to other embodiments, the operator station 104 may be at a remote location relative to the robot station 102, such as, for example, being in a different town, state, or country, among other distances. In such situations, the communication network or link 118 can have a configuration that accommodates such relatively long-distance communications between the operator station 104 and the robot station 102. For example, according to certain embodiments, the communication network or link 118 may, for example, include use of the internet or other network structure. However, the above examples are not necessarily exclusive based on the location of the relative locations of the operator station 104 and the robot station 102. Moreover, the above examples describing embodiments that can be utilized when the operator station 104 is relatively remote to the robot station 102 can also be used when the operator station 104 and the robot station 102 are in relatively close proximity to each other, and, conversely, the above examples describing embodiments that can be utilized when the operator station 104 is relatively close to the robot station 102 can also be used when the operator station 104 and the robot station 102 are in relatively remote proximity to each other.

FIG. 2 illustrates a portion of a robot of a robot station performing exemplary work on a workpiece. In the depicted embodiment, a sensor 114 in the form of a force sensor 130 is positioned between the end effector 108 and a subpart 132 that the robot 106 is assembling to a main part 134. According to the illustrated embodiment, the force sensor 130 can be integrated with haptic feedback capabilities of the teleoperation member 122. Moreover, the force sensor 130 can be used to detect and/or determine forces being experienced by, and/or imparted onto, the end effector 108 and/or robot 106 and can directly or indirectly provide corresponding information or data to the controller 112, the computation member 116 of the robot system 102, and/or the management system 122 of the operator station 104. The controller 112, computation member 116, and/or the management system 122 can utilize such data or related information to provide a signal to the teleoperation member 122 that is used to provide a visual, auditory, or physical signal to the operator of the teleoperation member 122 that may provide an indication of the relative degree of the force sensed by the force sensor 130. Moreover, the degree of haptic feedback provided by the teleoperation member 122, such as whether the force feedback is relatively large or small, may provide an indication of the extent of force sensed by the force sensor 130. For example, according to certain embodiments in which the teleoperation member 122 includes a display, a position(s) of an image and/or clarity of an image on the display may adjusted, with the degree or frequency of such adjustments corresponding to the degree of the force sensed by the force sensor 130. Further, according to certain embodiments, the haptic feedback of the teleoperation member 122 can be provided by an audible sound, the pitch, frequency, and/or volume of which can correspond to the degree of the force sensed by the force sensor 130. Further, according to certain embodiments, the haptic feedback of the teleoperation member 122 is provided by movement and/or resistance to movement of the teleoperation member 122, such as, for example, vibration(s) or degree of resistance to movement of a haptic joystick of the teleoperation member 122. Further, the extent and/or duration of such movement or resistance can correspond to the degree of the force sensed by the force sensor 130.

Referencing the exemplary embodiments depicted in FIGS. 1 and 2, during operation of the system 100, an operator maneuvers the movement of at least a portion of the robot 106, such as, for example an arm 110 and/or end effector 108, via operation of the teleoperation member 122, such as, for example, by operating a haptic joystick, among other types of teleoperation members 122. According to the illustrated embodiment, the robot 106 may have a grasp on the illustrated subpart 132 as the main part 134 to which the subpart 132 is to be assembled or otherwise attached moves or otherwise is positioned into the workspace of the robot 106. As the robot 106 is maneuvered by operation of the teleoperation member 122, and the subpart 132 is moved into contact with the main part 134, at least a portion of the forces generated by such contact between the subpart 132 and main part 134 are sensed by the force sensor 130. Force feedback information or data relating to, or indicative of, the forces sensed by the force sensor 130 can be communicated to the operator via the haptic capabilities of the teleoperation member 122, as previously discussed. For example, as mentioned above, according to certain embodiments, feedback of such forces can be communicated to the operator of the operator station 104 using a teleoperation member 122 in the form of vibrations in the joystick and/or by commanding the joystick to provide resistance to the operable movement of the joystick in the direction of those sensed forces. Such haptic feedback can provide the operator of the operator station 104 a sense or indication of what the robot 106 is experiencing during the operation of assembling the subpart 132 with the main part 134.

According to certain embodiments, the management system 122 can be configured to display on the display 124 a graphical user interface 136 (GUI) that can correspond to an orientation or position of one or more of the robot 106, end effector 108, and/or workpiece, such as the subpart 132 and the main part 134. According to certain embodiments, the GUI 136 can be software or an application that is stored and/or utilized by the management system 122 and displayed on the display 124. Further, according to certain embodiments, the GUI 136 may, or may not, be fully integrated with the operation of the teleoperation member 122, including, for example, a teleoperation member 122 in the form of a haptic joystick. For example, according to certain embodiments, the GUI 136 may provide a digital representation or image of one or more of the robot 106, end effector 108, and/or workpiece, but not of the teleoperation member 122. However, according to such embodiments, the movement or operation of the teleoperation member 122 may still be indicated by an indication of the movement relating to the robot 106 and/or workpiece that is displayed on the display 124.

Figure 3A:
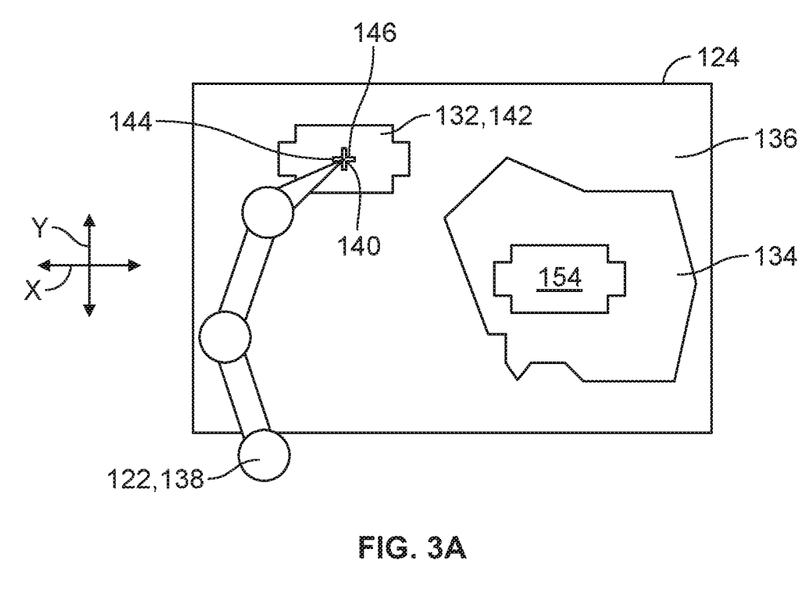
FIGS. 3A and 3B illustrate top and side views, respectively, of a graphical user interface (GUI) on a display digitally depicting the relative positions and/or orientations of a main part and a subpart, as well as a representation of a haptic joystick that is fully integrated with the GUI.
Figure 3B:
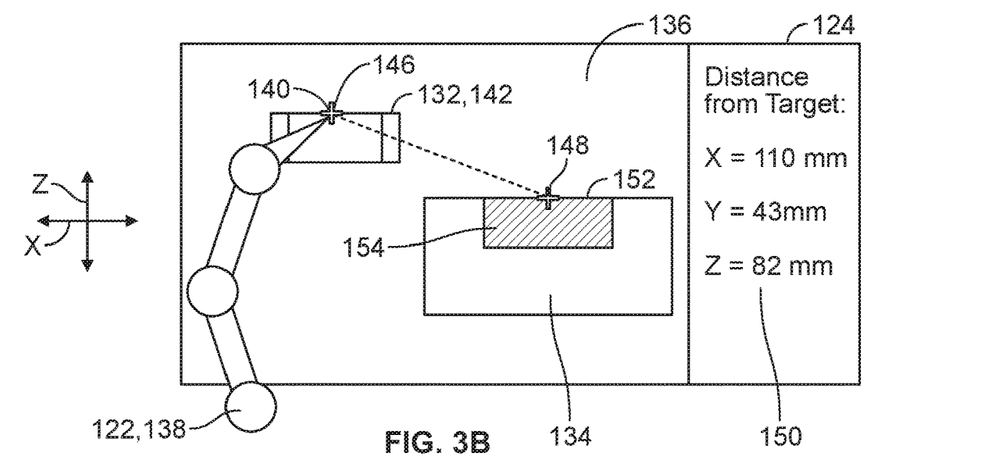

FIGS. 3A and 3B illustrate an exemplary graphical user interface 136 (GUI), as shown on the display 124, that is fully integrated with the operation of a teleoperation member 122 in the form of a haptic joystick 138. In the depicted embodiment, the subpart 132 is being held by the robot 106. According to such an embodiment, a tool center point (TCP) of the robot 106 and/or the haptic joystick 138 can be defined as a center point, among other points, relative to a location of the subpart 132 that is being held, grasped, or otherwise coupled to the robot 106 and/or the end effector 108 that is coupled to the robot 106. Thus, the movement of the selected TCP of the robot 106 can generally be defined by the movement of the subpart 132 that is held, grasped, or otherwise coupled to the robot 106. The TCP of the robot 106 can also be correlated to a coordinate system of the GUI 136, such as, for example, a three dimensional coordinate system used by the GUI 136 to identify the relative positions and/or orientations of the components of the robot station 102, such as, the robot 106, and the workpieces that are displayed by the GUI 136. Such correlation of the coordinate system of the GUI 136 to the TCP of the robot 106 can, depending on the embodiment, be in two dimensional and/or three dimensional systems.

According to certain embodiments, correlating the TCP of the robot 106 to the coordinate system of the GUI 136 based on the location and/or orientation of the subpart 132 that is being held, grasped, or otherwise coupled to the robot 106 can be attained in a variety of manners. For example, such correlation can include importing, downloading, or otherwise providing to the management system 122 and/or the GUI 136, the geometric shape of the subpart 132. The geometric shape of the subpart 132 can be obtained in a variety of different manners, including, for example, via information provided by a computer aided design (CAD) program and/or three-dimensional scanning techniques, among other manners of obtaining geometric information of the subpart 132. Such correlation can also include operating the robot 106 in a manner that the robot 106 or an end effector 108 coupled or mounted to the robot 106 touches three non-collinear points on the subpart 132 or representative subpart 132 in connection with defining the part coordinate frame transformation to robot base coordinate frame. Further, such touching can be used to ensure the locations and orientation of the subpart 132 are accurately represented in the GUI 136. According to such an approach, once the subpart 132 is gripped, held, or otherwise operably coupled by/to the robot 106, the position and/or orientation of the subpart 132 is known as such a position and/or orientation would stay in a known relationship to the end effector 108 of the robot 106 until the subpart 132 is released from the robot 106 and/or end effector 108.

Additionally, as indicated by FIG. 3A, unlike traditional systems that typically calibrate the work space of the haptic joystick 138 to the work space of the robot 106, the GUI 136 can also correlate the orientation and/or manipulation of the illustrated haptic joystick 138 to the coordinate system of the GUI 136. For example, according to certain embodiments, a calibration step can be implemented by at least the GUI 136 and/or management system 122 using information relating to the operation haptic joystick 138 that at least facilitates the correlating of the TCP 140 or work space of the haptic joystick 138 to the coordinate system of the GUI 136. According to certain embodiments, with the haptic joystick 138 calibrated to the coordinate system of the GUI 136, the operation or jogging of the haptic joystick 138 can be correlated to a movement of a particular identified location of the robot station 102, as depicted by a visual indication shown on the GUI 136. For example, referencing FIGS. 4A-4D, the position or orientation of the haptic joystick 138 can be synchronized on the GUI 136 to the location of a representation of the TCP of the robot 106 that is indicated or displayed on the GUI 136 by a first reference indicator 142. Moreover, according to such an embodiment, the location and/or orientation of a reference position on the haptic joystick 138, in this example the tip 144 of the haptic joystick 138, is synchronized to generally correspond to a reference location of the robot 106 and/or subpart 132 that can be visually depicted by the first reference indicator 142 that is displayed by the GUI 136. Accordingly, adjustments in the relative position and/or orientation of the haptic joystick 138 as the haptic joystick 138 is operably manipulated or jogged can be depicted by the GUI 136 in terms of movement of the first reference indicator 142 on the GUI 136. Thus, for example, FIGS. 4A-4D depict an example of the movement or jogging of the haptic joystick 138, the corresponding movement or changes in location of the first and second reference indicators 142, 146 as well as the corresponding position and/or orientation adjustments of the digital representation of the GUI 136 of the subpart 132 relative to the main part 134 during subsequent stages of assembly of the subpart 132 to the main part 134. Further, FIGS. 3A-3B depicted the orientation of one embodiment of the haptic joystick 138, as well the digital representation of the subpart 132 and main part 134 along two different combinations of axes of the GUI 136 (identified as the "X", "Y", and "Z" axes in FIGS. 3A and/or 3B) that correspond to the location and/or orientation of the first reference indicator 142 in the coordinate system of the GUI 136.

According to certain embodiments, the GUI 136 can be configured to accommodate adjustments by the operator of the orientation of the views and/or representations of the jogging provided by the GUI 136 of the robot 106, subpart 132, and/or main part 134, as depicted by the GUI 136 on the display 124. For example, FIG. 3A illustrates, in addition to the haptic joystick 138, a top view of the relative positions and/or orientations of the subpart 132 and main part 134, as represented by the GUI 136 on the display 124. According to such an embodiment, the GUI 136 can provide a view in a two of the three coordinate axes, as indicated, for example, by the "X" and "Y" coordinate axes shown in FIG. 3A. Alternatively, the operator can adjust the view provided by the GUI 136 on the display 124, such as, for example, to depict a side view of the relative positions and/or orientations of the subpart 132 and main part 134, and moreover the relative positions and/or orientations of the subpart 132 and main part 134 along a different combination of coordinate axes, namely the "X" and "Z" axes, as shown in FIG. 3B. Thus, for example, the ability to adjust views may at least assist in the maneuvering of the robot 106 and/or subpart 132 along different axes, such as, for example, FIG. 3B potentially providing a clearer indication of the relative positions, orientations, and/or displacement along the "Z" axes than FIG. 3A. Alternatively, the GUI 136 and display 124 can be adjusted or configured to provide views along all three axes, including, but not limited to, three dimensional views.

Figure 6:
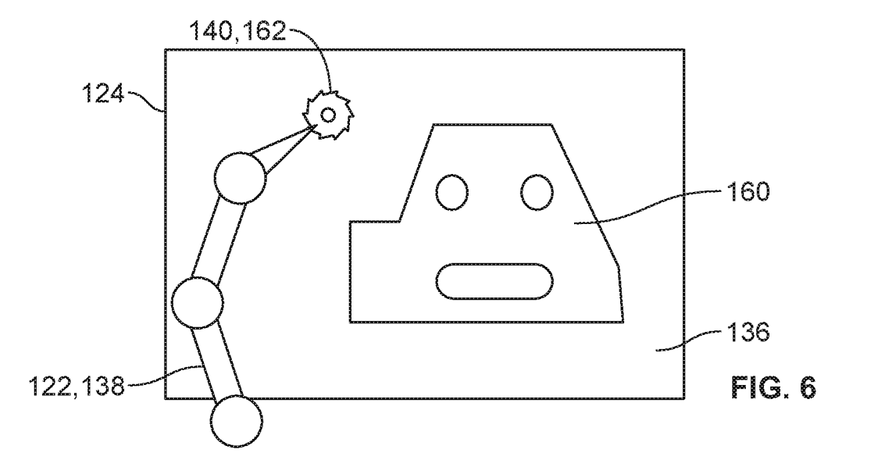
FIG. 6 illustrates an exemplary side view of a digital representation by a GUI of a workpiece, as well as a location of tool center point (TCP) coordinates of a haptic joystick and a robot, as correlated with a coordinate system of the GUI.

Additionally, as indicated by FIG. 3B, the GUI 136 can also be configured to provide information regarding the relative distances between a second reference indicator 146, such as, for example, a reference location of the robot 106, subpart 132, and/or end effector 108, relative to a target indicator 148, such as, for example, a target location of or around the main part 134. For example, as illustrated, the GUI 136 can include a legend 150 or other graphical indications or representations of the distance along one or more axes of the coordinate system of the GUI 136 between second reference location 146 and target location 148 of the subpart 132, main part 134, and/or certain components of the robot 106. For example, as shown in FIG. 6, according to certain embodiments, the GUI 136 can display a distance along three axes of the GUI coordinate system of the distance between the second reference indicator 146, such as a TCP of the subpart 132 and/or robot 106, and the target indicator 148. The distance(s) depicted by the GUI 136 can correlate to one or more actual distance or reference distances.

The second reference and target locations 146, 148 can be selected, for example, by use of the operator manipulating or jogging the haptic joystick 138, or other input devices of the management system 122 and/or the operator station 104. For example, the management system 122 and/or the GUI 136 can accommodate the operator entering the second reference indicator 146 and/or target indicator 148 when the operator positions an visual indicator, as shown on the GUI 136, at such selected locations via manipulation of the haptic joystick 138 or the inputting of information via another input device of the management system 122. Alternatively, according to certain embodiments, the GUI 136 and/or management system 122 can have information of the geometric configurations of the main part 134 and subpart 132 such that when one of the second reference indicator 146 for the subpart 132 and the target indicator 148 of the main part 134 is selected, stored, or otherwise inputted or provided to the management system 122, the management system 122 and/or GUI 136 can determine the corresponding second reference indicator 146 for the subpart 132 and the target indicator 148 of the main part 134. Further, the selected or determined second reference and target locations 146, 148 can be stored, assigned, recorded, or otherwise noted by the management system 122, including, for example, in the memory, and/or the software or application associated with the GUI 136.

A variety of locations can be selected as the second reference and target locations 146, 148. For example, in the embodiment illustrated in FIG. 3B, the target indicator 148 is depicted as being at an inlet 152 of the cavity 154 of the main part 134 that is to receive insertion of at least a portion of the subpart 132. Further, as shown in FIG. 3B, according to such an example, the second reference indicator 146 of the subpart 132 can be an upper portion of the subpart 132 that, when the subpart 132 and main part 134 are assembled together, is positioned at the inlet 152 of the cavity 154, and moreover, is positioned at the target indicator 148, when the subpart 132 is assembled to the main part 134. However, other locations of the cavity 154 or main part 134 can be selected as the target indicator 148. Further, according to certain embodiments, a plurality of second reference and target locations 146, 148 can be selected or used, such as different locations along a path of travel of the subpart 132 and/or positions and orientations that correspond to the final position of different parts or portions of the subpart 132 when the subpart is assembled to the main part 134.

Figure 4A:
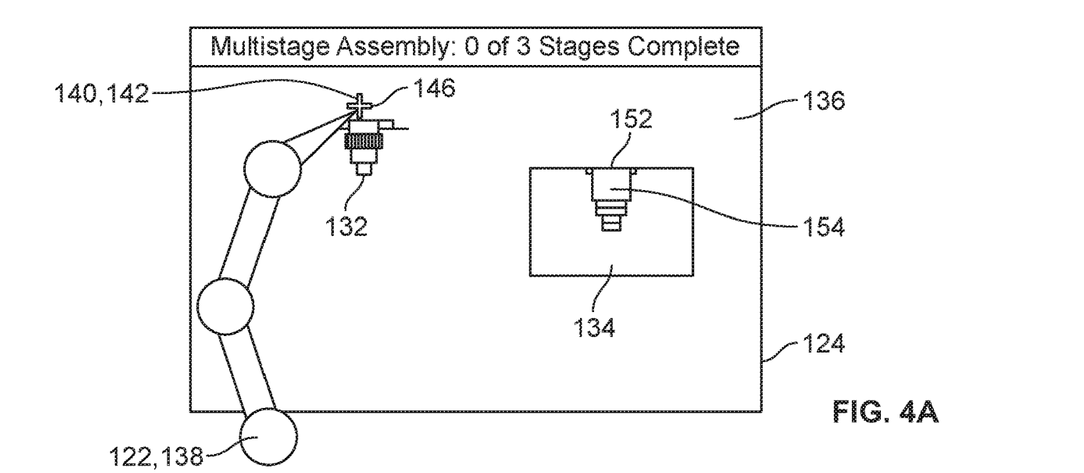
FIGS. 4A-4D illustrate a GUI depicting an example of the movement of a subpart and reference indicators digitally depicted by the GUI during different stages of assembly, and provides an exemplary representation of the associated manipulation of a haptic joystick that is fully integrated with the GUI during the different stages of assembly.
Figure 4B:
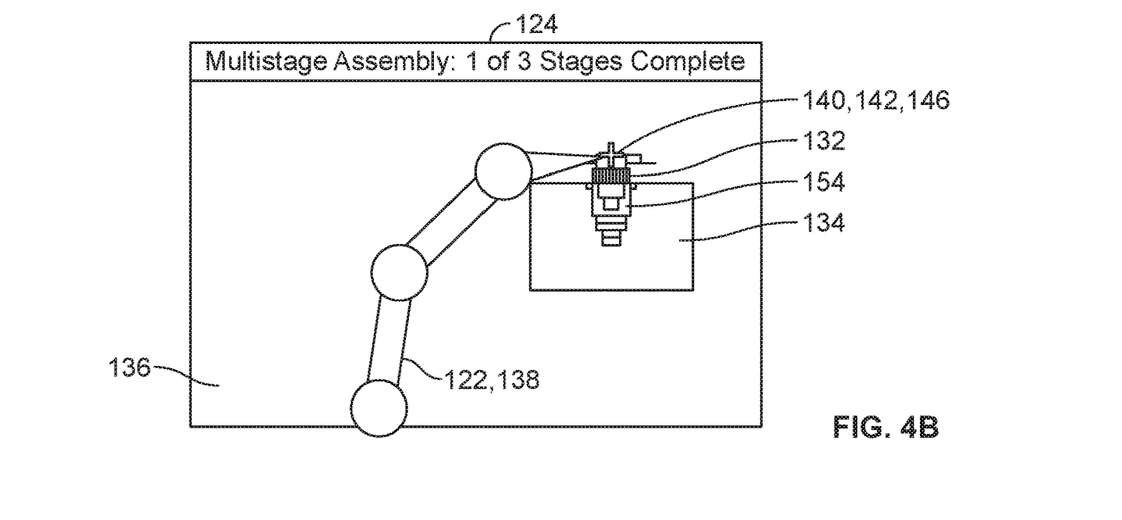
Figure 4C:
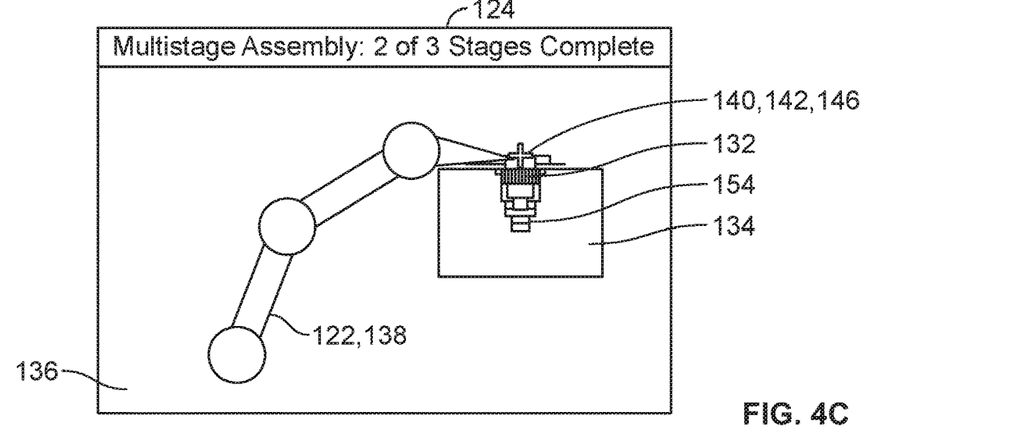
Figure 4D:
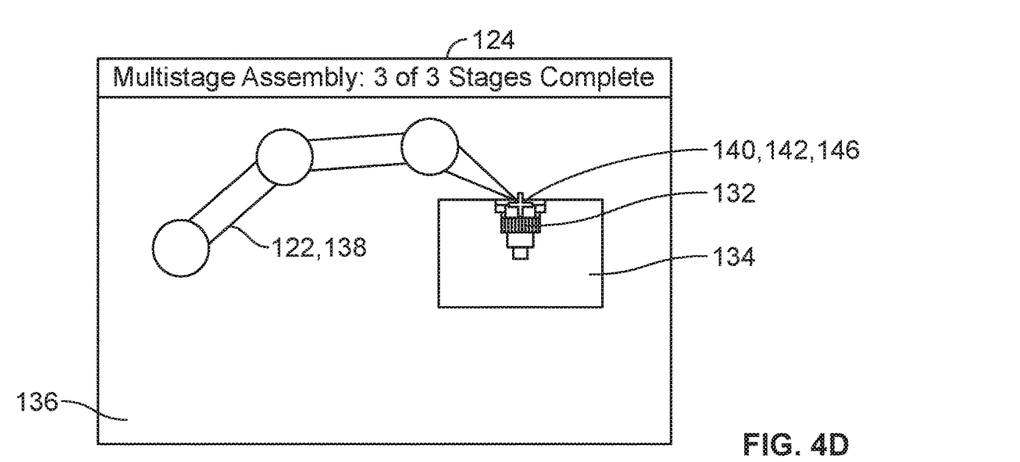

Referencing FIGS. 4A-4D, for multi-stage assemblies, the GUI 136 can be structured to graphically depict on the display 124, and/or provide a textual or graphical indication(s), of the current stage of the assembly of the subpart 132 to the main part 134. Further, as previously discussed, FIGS. 4A-4D further demonstrate the haptic joystick 138 being synchronized to the GUI 136 such that the movement or jogging of the joystick 138 correlates to the GUI 136 depicting the movement of a first reference indicator 142 that corresponds to a particular location and/or orientation of the robot 106 and/or subpart 132. Further, in the illustrated embodiment, the first reference indicator 142 can be the same, or at the same location and/or orientation, as the previously discussed second reference indicator 146. As shown by the illustrated example, adjustments of the haptic joystick 138 can be correlated to the movement of the first reference indicator 142 and/or second reference indicator 146 as the subpart 132 is moved from a position that is not part of the multi-stage assemblies (FIG. 4A), along the first two stage of assembly (FIGS. 4B and 4C), and eventually to a target indicator 148 that corresponds to the insertion of the subpart 132 into a cavity 154 of the main part 134 at a final assembly stage (FIG. 4D).

Figure 5:
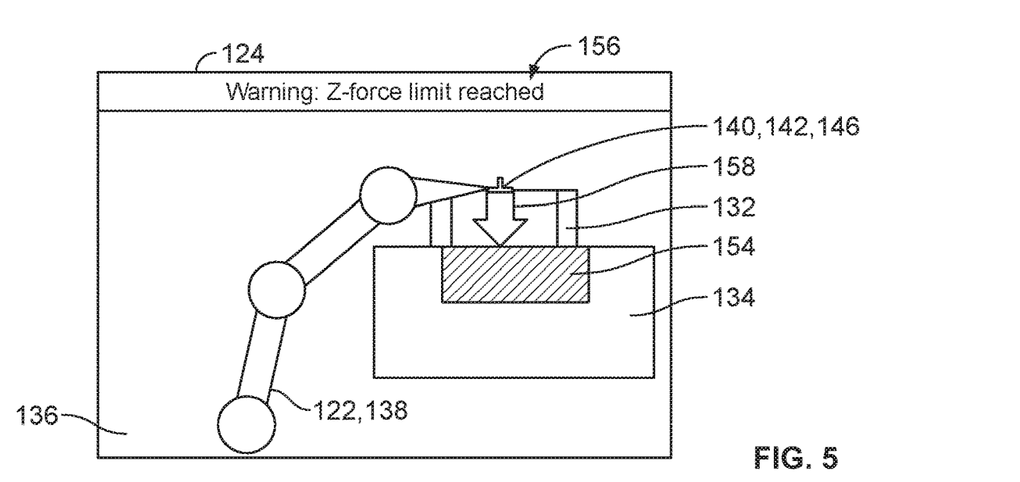
FIG. 5 illustrates a GUI depicting a side view of an exemplary assembly of a subpart to a main part, and which provides a textual and graphical indication of force feedback information.

Referencing FIG. 5, the GUI 136 can also be configured to provide a graphical and/or textual representation of force feedback information and/or force limits experienced at least as the haptic joystick 138 is manipulated in a manner that correlates to, at the robot station 102, the assembly of the subpart 132 to the main part 134. Such force feedback can be based, at least in part, on information provided by one or more sensors 114, including, for example, information provided by the force sensor(s) 130, as evaluated or processed by the sensor 114, 130 itself, the computation member 116, the management system 120, or other components of the robotic and/or operator stations 102, 104. For example, FIG. 5 illustrates an example of the GUI 136 providing both a textual message 156 and graphical warning indicator 158 of a force warning. Further, according to certain embodiments, the GUI 136 may display an indication of the direction and/or the basis and/or factor of the basis of the force warning. For example, as shown in FIG. 5, the textual message 156 can provide an indication of a direction associated with the force warning, such as, for example, an indication that the force limit is being reached along the "Z" axis. Similarly, the graphical warning indicator 158 of the force warning can also be configured to provide an indication of the nature of the force warning, such as, for example, providing an arrow indicating a direction associated with the force warning, such as, for example, pointing generally in the "Z" direction. Such a textual message 156 and/or graphical warning indicator 158 can, for example, assist in guiding the operator of the operator station 104 in aligning the subpart 132 to the main part 134 and/or a notification of the existence of subtle misalignment of the parts 132, 134 or a jamming situation. While FIG. 5 is illustrated in terms of the textual message 156 and graphical warning indicator 158 providing warnings relating to force feedback, the GUI 136, management system 120, and/or computation member 116 can be configured to use the textual message 156 and graphical warning indicator 158 for providing information in addition to, or, alternatively, instead of, force feedback information, including, for example, information regarding a detected defect in the subpart 132 and/or an improper position, orientation, or grip of the robot 106 relative to the subpart 132, among other information.

FIG. 6 illustrates an exemplary side view of a digital representation of a workpiece 160 by a GUI 136 on a display 124, as well as a location of a TCP 140 of a haptic joystick 138, as correlated with a coordinate system of a GUI 136, rather than being calibrated to the work space of the robot 106. Further, in the depicted example, the location of a TCP 140 of the depicted teleoperation member 122, moreover the haptic joystick 138, is shown as correlating to the TCP 162 of the robot 106, as correlated to the coordinate system of the GUI 136. More specifically, calibration of the TCP 140 of the depicted teleoperation member 122, and moreover of the illustrated haptic joystick 138, can be utilized as an additional calibration step that involves correlating the work space of the haptic joystick 138, such as the range of operation of the joystick 138, to the coordinate system of the GUI 136. In such a situation, with the work space of the haptic joystick 138 calibrated to the coordinate system of the GUI 136, as the operator manipulates the haptic joystick 138 about the workspace of the joystick 138, the movement of the joystick 138 and the resulting movement of the robot 106, as depicted by movement displayed by the GUI 136 on the display 124, can be synchronized.

Figure 7:
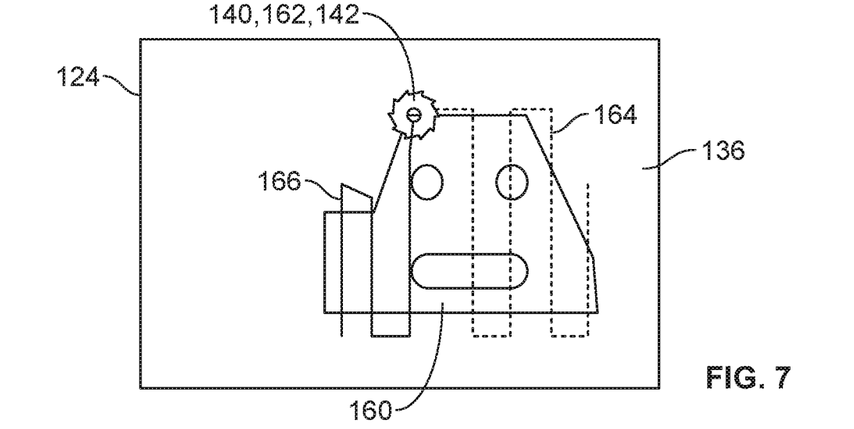
FIG. 7 illustrates an exemplary side view of a digital representation of a workpiece by a GUI on a display that provides guidance in the form of a path a TCP of a robot is to travel during a work process on a workpiece.

FIG. 7 illustrates an exemplary side view of a digital representation of a workpiece 160 by a GUI 136 on a display 124 that provides guidance in the form of a first path 164 the TCP 162 of the robot 106 is to travel during a work process on a workpiece. According to the depicted example, the robot 106 can be operating a cutting device in connection with the removal of material from the workpiece 160, among other types of possible work processes. The first path 164 can correspond to a predetermined path the TCP 162 of the robot 106, such as, for example a path the robot 106 is planned or selected to take either before or during the operation of the robot 106, and can be depicted by the GUI 136 on the display 124 in a variety of manners. For example, according to the depicted example, the first path 164 can be represented by broken or dashed lines, among other line formats, or other graphical or textual representations. Further, according to certain embodiments, the GUI 136 can also display on the display 124 an indication of second path 166 that corresponds to a tracked path traveled by the TCP 162 and/or the portion of the first path 164 that the TCP 162 has already generally traveled relative to the workpiece 160. The second path 166 can be depicted in a manner that distinguishes the second path 166 from the first path 164, such as, for example, via use of different line style(s) and/or color(s). Further, according to certain embodiments, during use of the robot 106, the second path 166 can be displayed alongside or over the corresponding portion of the first path 164 and/or can replace that generally traveled portion of the first path 164. However, according to certain embodiments, the extent the TCP 162 of the robot 106 follows the first path 164 can vary, as, for example, variances associated with differences in the amount of material that may be removed at different locations of the workpiece 160. Additionally, the GUI 136 can also display a first reference indicator 142 that corresponds to the current location of the TCP 162 of the robot 106.

The teleoperation robotic system 100 can also be configured to provide a variety of other types of information relating to the work processed done, or planned to be done, on a workpiece 160 by a teleoperated robot 106. A variety of different information provided from a variety of sources of the robot station 102 and/or operation station 104 can be depicted on by the GUI 136 on the display 124. For example, referencing FIG. 8, as previously discussed, the position and/or orientation of the TCP 162 of the robot 106 can be depicted on the GUI 136 by a first reference indicator 142. Further, the first reference indicator 142 on the GUI 136 can be depicted in a variety of shapes, colors, and sizes, such as, for example, in the shape of a cutting blade. Additionally, as the teleoperation member 122 is manipulated by an operator, and the corresponding position and/or orientation of the robot 106 is adjusted, the change in position and/or orientation of the TCP 162 of the robot 106, and thus the corresponding location of the first reference indicator 142 on the GUI 136, can be determined by the management system 120 via the correlation or synchronization between at least the teleoperation member 122, the location of the TCP 162 of the robot 106, the coordinate system of the GUI 136, and/or the location and inputted geometric features of the workpiece 160. Additionally, the computation member 116 and/or management system 120 may receive positional and/or orientation information for the robot 106 and/or the TCP 162 of the robot 106 from one or more of the sensors 114, such as, for example, a position sensor, accelerometer, and/or a captured image(s) through the use of a vision system, such, as, for example, a vision system having one or more cameras or imaging capturing devices, among other types of sensors. Such information may provide, or be used by the computation member 116 and/or management system 120 to determine, the position and/or orientation of the robot 106 and/or the TCP 162 of the robot 106.

Additionally, one or more characteristics of the first reference indicator 142 displayed on the GUI 136 can change based on changes in the certain aspects of the location or operation of the robot 106, TCP 162 of the robot 106, and/or the end effector 108. For example, according to certain embodiments, the visual appearance of the first reference indicator 142 in the GUI 136 can change based on changes in vertical and/or horizontal positions of the TCP 162 of the robot 106 relative to the workpiece 160 or other aspects of the robot station 102. For example, a size, shape, and/or color of the first reference indicator 142 may change as the TCP 162 of the robot 106 is moved to different heights, lengths, or locations of the workpiece 160. Additionally, according to certain embodiments, operation indicia 168 can be displayed on the GUI 136 to indicate states of operation of the end effector 108, such as indicating when the end effector 108 is in an off state. For example referencing FIG. 8, operation indicia 168 in the form of a lightning bolt can be superimposed over the first reference indicator 142 when the end effector 108 is being operated, such as, for example, when an end effector 108 in the form of a cutting or milling tool, among other tools or devices, is performing work on the workpiece 160.

Similarly, one or more characteristics of the workpiece 160 digitally reproduced or otherwise displayed by the GUI 136 on the display 124 can change based on work performed by the robot 106, and more specifically, the robot 106 using the end effector 108. For example, according to certain embodiments, a portion of the workpiece 160 depicted or displayed by the GUI 136 can change in color or shape, or have other visual indicators superimposed on the depiction of the workpiece 160 to indicate the location and/or nature of work to be, or already performed, on the workpiece 160. For example, referencing FIG. 8, depth of a cutting or milling operation on the workpiece 160 performed using the robot 106 and/or end effector 108 can be indicated by the addition, or changes, in color in the general portion, area, or general location of the work, among other graphical or textual indicators. For example, in FIG. 8, a first region ("$X_1$"), a second region ("$X_2$"), and a third region ("$X_3$") shown in the workpiece 160 can correspond to differences in depth of cutting or milling operations in the workpiece 160 by operation of the end effector 108 of the robot 106. An indication of such regions ($X_1$, $X_2$, $X_3$) can be provided by a variety of manners, including by coloring sections of workpiece 160 depicted by the GUI136 to indicate those depths, or lines superimposed in the depicted image, among other visual indications. Further, the depth of such cuts or milling operations into the workpiece 160 can be determined in a variety of manners, including, for example, by the management system 120 via the correlation or synchronization between at least the teleoperation member 122, the location of the TCP 162 of the robot 106, the coordinate system of the GUI 136, and/or the location and inputted geometric features of the workpiece 160. Additionally, the computation member 116 and/or management system 120 may receive positional and/or orientation information for the robot 106 and/or the TCP 162 of the robot 106 from one or more of the sensors 114, such as, for example, a position sensor, accelerometer, and/or a captured image(s) form one or more cameras, among other types of sensors 114 as well as and/or information of the location and geometric features of the workpiece 160 that allow the management system 120 and/or computation member 116 to determine such information.

Figure 8:
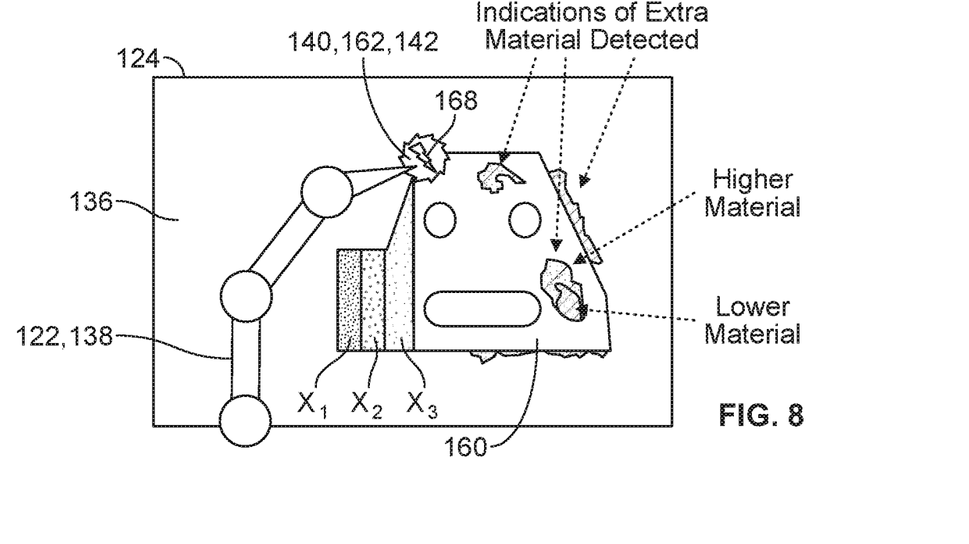
FIG. 8 illustrates an exemplary side view of a digital representation by a GUI of a workpiece on a display that provides an indication of depths operations performed by the robot into the workpiece, areas of excess and reduced material, and a representation of an associated orientation of a manipulated haptic joystick that is fully integrated with the GUI.

Referencing FIG. 8, according to certain embodiments, the sensors 114 of the robot station 102 can also include one or imaging devices that are configured to provide information relating to a three dimensional image of a least a portion of the workpiece 160. Such information obtained by the sensor(s) 114 can be communicated to the computation member 116 and/or management system 120. Further, according to certain embodiments, such information from the sensor(s) 114 can be compared base geometrical information for such workpieces in connection with determining any apparent discrepancies between the scanned workpiece 160 and reference dimensions for such workpieces. Such comparisons may assist in identifying the presence, and location in terms of the coordinate system of at least the GUI 136, of potential defects or discrepancies in the in the scanned workpiece 160, such as, for example, locations on the workpiece 160 where excess or higher material is present and/or areas missing, or having lower, material. The presence of such defects or discrepancies can, via correlation to at least the coordinate system of the GUI 136, as well as the general correlation of the workpiece 160 to the coordinate system of the GUI 136, be depicted on the GUI 136. The operator at the operator station 104 may then manipulate teleoperation member 122 so as to maneuver the robot 106 to a location at which the end effector 108 can perform work on the workpiece 160 to address such defects or discrepancies in/on the workpiece 160.

While, for purposes of illustration, embodiments herein discuss tracking the location of the TCP 162 of the robot 106, it is understood that other locations in the robot station 102 can similarly be tracked, and features described herein can similarly apply to those other tracked locations or positions, including, for example, positions and/or orientation relating to the end effector 108, workpiece 160, and/or other portions of the robot 106.

Additionally, according to certain embodiments, digital representations provided by the GUI 136, such as, but not limited to, the TCP 162 of the robot 106, the first path 164 (or path guidance), the second path 166 (or path history), the amount of material removed from the workpiece 160, the depth of cut or milling into the workpiece 160, among other process information, can overlay video images displayed on the display 124, such as, for example, video images captured by an image capturing device, such as a camera, in the robot station 102. Additionally, the digital representations provided by the GUI 136 can be generated in three-dimensional view and overlaid on three-dimensional view video and three-dimensional view point cloud from the cameras. Further, the digital representations provided by the GUI 136 of the workpiece 160 can be generated based on different viewpoints and scaled according to the pan, tilt and/or zoom of the image capturing device, the selection or type of image capturing device, and/or the rotation, pan and zoom of the view in the GUI 136. Multiple image capturing devices can also be used in order to provide relatively good visual accessibility for the robot 106 working on different areas of the workpiece 160.

According to certain embodiments, the teleoperation robotic system 100 can be configured to accommodate selection of certain operations and procedures on the workpiece 160 via point and click capabilities using the teleoperation member 122. For example, according to certain embodiments, the teleoperation member 122 may select an area of the workpiece 160 that is to have material removed by operation of the robot 106 and the associated end effector 108. According to such an embodiment, the teleoperation member 122 may be operated to select the area that is to be subjected to material removal, and the management system 120 and/or computation member 116 may be structured to translate such a selection into commands for the robot 106 and/or end effector 108 that can include guiding the movement of the robot 106 and operation of the end effector 108 in a manner that results in the removal of the selected material.

Such point and click capabilities can also be used by the teleoperation member 122 to select or define a path of travel, such as the first path 164, that is to be taken by the robot 106 and/or end effector 108 in performing work on the workpiece 160. Further, such functionality can cause the teleoperation robotic system 100 to switch from a teleoperation mode in which commands or instructions are being provided by at least by the operation of the teleoperation member 122, to a program mode, wherein the management system 120 and/or computation member 116 translate those commands from the teleoperation mode to instructions and signals used by the robot 106 and/or end effector 108 to carry out the commands or instructions from the teleoperation mode. Further, such point and click functionality can also accommodate editing of virtual constraints, such as, for example, force and speed limits, among others, based on the digital representations of the GUI 136, such as for example, representations regarding the amount of material removed and surface quality of the workpiece 160.

As can be appreciated, coordinating the location of the teleoperation member 122 and display of the workpiece(s) 160 on which the robot 106 or end effector 108 is performing can make the teleoperated assembly operation more intuitive, especially when the operator cannot see the workpiece(s) 160 via a direct line of sight. Further, such a system 100 can also allow the operator to better understand the operation of the robot 106 and/or end effector 108 and the progress in performing associated work on the workpiece 160. As can be also appreciated, additional information, such as, for example, assembly stages and assembly forces, among other information, can be part of the information provided by the GUI 136, which can further improve the usability of the system 100.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A system for providing a graphic user interface for a teleoperation robotic system having a teleoperated member at an operator station and a robot at a robot station, the system comprising:
   a computing device having at least one processor, the computer device configured to:
   receive a first input information having a robot indicator, the robot indicator indicating at least one of a position or an orientation of at least a portion of the robot, the first input information including information detected by one or more sensors in the robot station;
   calibrate the robot indicator to a coordinate system of the graphic user interface to attain a calibrated robot indicator;
   receive a second input information having a teleoperated member indicator, the teleoperated member indicator indicating at least one of a position or an orientation of the teleoperated member;
   calibrate the teleoperated member indicator to the coordinate system of the graphic user interface to attain a calibrated teleoperated member indicator;
   synchronize the calibrated teleoperated member indicator to a location of a representation of the calibrated robot indicator that is visually depicted on the graphic user interface; and
   display, on a display, the graphical user interface, the graphical user interface configured to display a movement in the robot station that is associated with at least a movement of the robot that is correlated to the operation of the teleoperated member.

2. The system of claim 1, further including the display and a communication network, the communication network having one or more communication links structured to communicatively couple the robot station to the operator station, the one or more communication links configured to communicate at least one of the first input information from the robot station and the second input information from the operator station to the computing device.

3. The system of claim 1, wherein the teleoperated member is a haptic joystick.

4. The system of claim 1, wherein the robot indicator includes:
   a portion or orientation of a tool center point of the robot; and/or
   a position or orientation a tool center point of an end effector of the robot.

5. The system of claim 1, wherein the teleoperated member indicator is at least one of a position or an orientation of a tool center point of the teleoperated member.

6. The system of claim 1, wherein the computing device is further configured to correlate an inputted geometric shape of a workpiece in the robot station to the coordinate system of the graphic user interface, and further wherein the computing device is configured to synchronize at least one of a position and an orientation of the workpiece to the calibrated robot indicator.

7. The system of claim 6, wherein the one or more sensors detect information relating to one or more geometric characteristics of the workpiece.

8. The system of claim 7, wherein the computing device is configured to determine the presence of one or more discrepancies between the workpiece and the inputted geometric shape, and wherein the graphic user interface is adapted to visually depict at least one of the determined one or more discrepancies; and
   wherein the one or more discrepancies includes at least one of a difference in material quantity, geometric shape, or a dimensional size.

9. The system of claim 8, wherein the one or more sensors include a vision system adapted to detect the one or more geometric characteristics of the workpiece.

10. The system of claim 1, wherein the computing device is further configured to:
   receive a third input information from a force sensor coupled to the robot;
   compare the received third input information to a force threshold value;
   display on the graphical user interface on the display at least an indication of the third input information; and
   wherein the computing device is further configured to display on the graphical user interface an indication of at least one of (1) the third input information exceeding the force threshold value, and (2) a force direction for the third input information that is correlated by the computing device to the coordinate system of the graphic user interface.

11. The system of claim 1, wherein the computing device is configured to:
display on the graphical user interface a first path of travel and a second path of travel, the first path of travel corresponding to a predetermined path to be travelled to perform work on the workpiece, the second path of travel corresponding to a tracked path of travel taken while work was performed on the workpiece by operation of the robot; and/or
assign a reference indicator to one or more of the calibrated robot indicator and the calibrated teleoperated member indicator, and wherein the computing device is configured to display the reference indicator on the graphic user interface; and/or
display on the graphic user interface on the display the reference indicator and one or more target indicators, the one or more target indicators corresponding to one or more of at least one of a location or orientations the reference indicator is to attain on the graphic user interface during assembly of the workpiece; and/or
determine a distance along one or more axes of the coordinate system of the graphic user interface, and wherein the computing device is configured to display on the graphic user interface one or more of the determined distances.

12. The system of claim 1, wherein the computing device is adapted to depict on the graphical user interface of the display an indication of a stage of work of a plurality of stages of work, each of the plurality of stages of work correspond to a different progression or step of an assembly or work performed by operation of the robot, the computing device further adapted to provide a visual representation of the completion of one or more of the stages of work and a visual indication of a subsequent initiation of another one of the plurality of stages of work.

13. The system of claim 1, wherein the computing device is further configured to determine and display the location on the workpiece of one or more work processes preformed on the workpiece by operation of the robot; and
wherein the one or more work processes is a material removal operation by the end effector of the robot, and wherein the computing device is configured to display on the graphical user interface a visual indication of a depth of material removal from the workpiece by the one or more work processes.

14. The system of claim 1, wherein the computing device is configured to display on the graphical user interface an indication of an operative state of the robot; and
wherein the indication of the operative state of the robot is an indication of an on state or an off state of operation of the end effector.

15. The system of claim 1, wherein the computing device is adapted to receive, via a selection using the teleoperated member, identified areas of the workpiece, and translate the selection into one or more commands for work on the workpiece by the robot; and
wherein the one or more commands are instructions relating to the end effector removing material from the identified areas of the workpiece.

16. A method for providing a graphic user interface for a teleoperation robotic system having a teleoperated member at an operator station and a robot at a robot station:
detecting, using one or more sensors of the robot station, a robot indicator, the robot indicator comprising at least one of a position or an orientation of at least a portion of the robot;
communicating the robot indicator to a computing device;
correlating the robot indicator to a coordinate system of the graphical user interface to provide a calibrated robot indicator;
detecting a teleoperated member indicator, the teleoperated member indicator comprising at least one of a position or an orientation of the teleoperated member;
correlating the teleoperated member indicator to the coordinate system of a graphical user interface to provide a calibrated teleoperated member indicator;
synchronizing the correlated teleoperated member indicator to a location of a representation of the correlated robot indicator that is visually depicted on the graphic user interface; and
displaying, on a display, a movement in the robot station, the movement being synchronized by the computing device to correspond to a movement of the teleoperated member.

17. The method of claim 16, further including the step of transmitting, over a communication network and to the robot station, an instruction outputted from the computing device, the instruction corresponding to instructed movement of the robot and based on corresponding movement of the teleoperated member.

18. The method of claim 16, further including the steps of:
correlating a geometric shape of a workpiece to the coordinate system of the graphic user interface; and
synchronizing at least one of a position or an orientation of the workpiece in the robot station to the correlated robot indicator.

19. The method of claim 16, further including the steps of:
capturing, by an image capturing device, an image of a shape of at least a portion of the workpiece;
comparing one or more features of the captured image to an inputted geometric shape of the workpiece; and
depicting, from the comparison of the captured image to the inputted geometric shape, on the graphic user interface at least one of the determined one or more discrepancies in the shape of the workpiece.

20. The method of claim 16, further including the steps of:
sensing a force exerted on or by the robot;
determining if the sensed force exceeds a force threshold value;
displaying, if the sensed force exceeds the force threshold value, on the graphical user interface a visual indication of the sensed force;
wherein the step of displaying the sensed force includes:
correlating a location of the sensed force to the coordinate system of the graphic user interface; and/or
displaying a direction of the sensed force relative to at least the coordinate system of the graphic user interface.

21. The method of claim 16, further including the steps of:
determining a first path of travel, the first path of travel corresponding to a predetermined path to be travelled when preforming work on the workpiece by operation of the robot; and/or
determining a second path of travel, the second path of travel corresponding to a tracked path taken for work performed on the workpiece; and/or
displaying on the graphic user interface at least a portion of at least one of the first and second paths; and/or displaying on the graphical user interface a reference indicator, the reference indicator corresponding to one or more of the calibrated robot indicator and the calibrated teleoperated member indicator; and/or displaying on the graphical user interface one or more target indicators, the one or more target indicators corresponding to one or more of locations and/or orientations the reference indicator is to reach on the graphic user interface during assembly of the workpiece by operation of the robot; and/or determining one or more distances between the reference indicator and one or more of the one or more target indicators; and/or displaying on the graphical user interface the one or more distances.

22. The method of claim 16, further including the steps of:

determining a location on the workpiece of one or more work processes preformed on the workpiece during operation of the robot;

correlating the determined location on the workpiece of the one or more work processes performed on the coordinate system of the graphic user interface;

displaying on the graphical user interface a visual indication of the determined location on the workpiece of the one or more work processes preformed; and wherein the one or more work processes performed is a material removal operation by the end effector of the robot, and wherein the step of displaying on the graphical user interface the indication of the determined location on the workpiece of the one or more work processes preformed includes displaying a visual indication of a depth of material removal from the workpiece by the one or more work processes.

23. The method of claim 16 further including the step of:

displaying on the graphical user interface an indication of an operative state of an end effector of the robot; and/or selecting, via operation of the teleoperated member, areas of the workpiece; and/or translating the selected areas into one or more commands for work on the workpiece by operation of the robot; and wherein the one or more commands comprises instructions for the end effector to remove material from the selected areas of the workpiece.

24. A system comprising:

a graphic user interface operably connected to a teleoperating robot;

a control system having a teleoperated member operably connected to the graphic user interface and the robot;

a robot sensor configured to transmit a robot indicator input information to the control system, the input information including a position and/or an orientation of at least a portion of the robot;

a coordinate system calibrated to at least a portion of the robot indicator input with the graphic user interface;

a teleoperated member sensor configured to transmit a position and/or an orientation of the teleoperated member, wherein the coordinate system is calibrated to define a teleoperated member indicator with the graphical user interface; and wherein the controller is configured to synchronize the calibrated teleoperated member indicator to a location of a representation of the calibrated robot indicator that is visually depicted on the graphic user interface and display a movement of the robot with a coordinated movement of the teleoperated member on the graphical user interface.

* * * * *